2,959,554
BLEACHING COMPOSITION

Homer L. Robson, Lewiston, N.Y., assignor to Olin Mathieson Chemical Corporation, a corporation of Virginia No Drawing. Filed Apr. 11, 1956, Ser. No. 577,448

2 Claims. (Cl. 252—99)

This invention relates to a product suitable for laundry use either in the home laundry or in commercial establishment. The product is a bleach based on calcium hypochlorite, which can be used without formation of calcium soap curds or "soap specks." The product can be used in the usual dosage or, with very heavily soiled clothes, in several times the usual dosage. Addition of the product to a suds bath will not lower the suds or decrease their value.

The product is a combination of a granular form of calcium hypochlorite and bead-form sodium tripolyphosphate, preferably a sodium tripolyphosphate containing some tetrasodiumpyrophosphate, such as 2 to 10 weight percent, based upon sodium tripolyphosphate plus tetrasodiumpyrophosphate.

A mixture of calcium hypochlorite and sodium tripolyphosphate has been considered a desirable bleaching material for some time, but there has not, heretofore, been a suitable mix. If a calcium hypochlorite preparation is blended with a solubilizing amount of ordinary sodium tripolyphosphate, the mixture will not perform satisfactorily. Current production of sodium tripolyphosphate is about half a million tons per year. Nearly all of this is made as a fine ground material. The fine grinding is required to offset the slow rate of solution. This fine ground material, if not diluted with other material, has a pronounced tendency to cake when added to water. If the fine ground material is mixed with calcium hypochlorite, the caking tendency is increased. This is because calcium tripolyphosphate is an insoluble salt, which is soluble in a large excess of sodium tripolyphosphate. When a powdered mixture of sodium tripolyphosphate and calcium hypochlorite is thrown onto the surface of water, penetration of the water is retarded by the powdery nature of the materials. In the film surrounding the powder, a precipitate of calcium tripolyphosphate forms. This further retards penetration of water into the mass and subsequent solution of the mixture. As a result the mass may form a lump taking some time to dissolve. In laundry use, this lump will normally sink and contact cloth. If conditions of agitation or the fold of the cloth are such that the lump is retained for a minute or so in contact with the same area of cloth, bleach damage results. Mixtures of calcium hypochlorite and conventional sodium tripolyphosphate have been tried for both home laundry and commercial laundry work, and the mixtures have been abandoned because of this lumping with subsequent bleach damage to the clothes.

Early recognition of the desirability of combining calcium hypochlorite with a solubilizing amount of polyphosphate is illustrated by the issuance of U.S. Patent 2,097,517 in 1937. Shortly after the issuance of this patent, two bleach products were offered commercially based on blends of sodium hexametaphosphate and calcium hypochlorite. These did not meet customer acceptance. On exposure to the air the metphosphate gummed up, and due to the added water content the available chlorine was lost at an excessive rate. Several formulas were tried in an endeavor to get a material which would rapidly disperse and dissolve in water, but this aim was not realized. Diluting the mix with sodium chloride, in flake form, improved the dispersion and subsequent solution but not sufficiently. Within a year both products were dropped.

Sodium hexametaphosphate was soon recognized as an undesirable constituent in a mix containing calciumhypochlorite. Sodium hexametaphosphate gives an acid solution in contact with water, and is quite hygroscopic, so that it will pick up water from exposure to air readily. As a result of this, some particles of sodium hexametaphosphate may have a thin film of acid solution on them. When this is mixed with calcium hypochlorite, some chlorine or chlorine monoxide is liberated. This produces an offensive odor of chlorine over the material. With proper preparation and handling the loss of available chlorine may be so small that it may be neglected, but the odor presents a serious problem. Various methods have been tried in an effort to reduce the odor of chlorine, without achieving adequate success. The sodium hexametaphosphate may be "adjusted" by addition of soda ash, as by blowing soda ash fines in a stream of dry air against the hexametaphosphate on a drum surface. This results in material which gives a more neutral solution, but many particle surfaces are left acid and these will develop a chlorine odor on contact with calcium hypochlorite preparations. Further, in use, such material picks up additional moisture from the air, after which the loss of available chlorine due to acid action may become serious. On prolonged exposure to moist air, complete loss of the available chlorine may be expected. Sometimes, on exposure to moist air, a sticky film may form over the surface of the mix. If this is then mixed with the lower material, as by inserting a spoon, chlorine may be released in objectionable amounts. This sticky material also makes the mix inconvenient to handle.

Mixtures of sodium hexametaphosphate and calcium hypochlorite may not give clear solutions. Although a solubilizing amount of hexametaphosphate may be present, on addition of the mix to hot or warm water, a precipitate of calcium metaphosphate may form around the calcium hypochlorite grains. These grains will then dissolve quite slowly, in spite of mild agitation. Calcium hypchlorite is usually prepared in a dustless or low dust state for household use. One popular form consists largely of particles passing a 30 mesh screen but retained on a 70 mesh screen (U.S. Standard Sieve). Such material, if admixed with a solubilizing amount of hexametaphosphate and thrown into warm water, may give coated grains which persist for several minutes. If powdered calcium hypochlorite and powdered hexametaphosphate are used, the mixture on addition to water may form lumps which coat over and are fairly persistent.

Thus attempts to market mixtures of calcium hypochlorite with a solubilizing amount of either sodium tripolyphosphate or sodium hexametaphosphate have been unsuccessful. More satisfactory material may be made by employing sodium pyrophosphate as the solubilizing phosphate, but such mixes have so low an available chlorine content, around 4 percent, that they are not considered attractive and have not been successfully marketed.

In the product of our invention, sodium tripolyphosphate in the form of hollow beads is first produced, as by spray drying. Preferably, the bulk of the material lies in the range of through 30 mesh and retained on 100 mesh (U.S. Standard Sieve). The portion of fines passing a 100 mesh screen can be reduced to a few percent by screening, or controlled by process operations to not exceed a set value such as 10 to 12 percent by weight. Similarly, the portion coarser than 30 mesh can be rejected by screening or otherwise controlled to be so small as not to cause trouble, a suitable limit being less than 5 percent by weight coarser than 30 mesh. If the portion coarser than 30 mesh were present as individual hollow beads, the presence of 10 to 15 percent could be permitted. Normally, however, the coarser particles in a spray formed material consist of aggregates of a number of hollow spheres which have adhered together during the spray forming process and these are best restricted to a small amount, such as 2 to 3 percent by weight, by screening.

The calcium hypochlorite commercial material is normally of 73 percent available chlorine content but may contain about 70 to 76 percent available chlorine. It is used in granular form, such as the through 30 mesh, retained on 70 mesh material mentioned above. Here, again, the weight percent of fines passing a 100 mesh sieve should not exceed 10 to 12 percent, and the weight percent coarser than 30 mesh should be less than 5 percent.

The sodium tripolyphosphate and calcium hypochlorite are mixed in proportions which are satisfactory for the intended use. A "solubilizing" amount of tripolyphosphate will vary according to use conditions. For commercial laundry use, the weight ratio of sequestering phosphate (sodium tripolyphosphate plus tetrasodiumpyrophosphate) to calcium in the form of calcium hypochlorite (of 70–75 percent available chlorine content) will be in the range 25:1 to 33:1, to avoid formation of a calcium carbonate muddiness on addition of the mixture to a carbonate-containing water. When the composition is to be used for dishwashing purposes, the weight ratio of sequestering phosphate to calcium in the form of calcium hypochlorite can be within the range 25:1 to 100:1.

The sequestering or solubilizing action of sodium tripolyphosphate is an equilibrium action, and the amount required varies with the solubility of the calcium salt involved. When clothes are washed in sodium oleate, for example, a low ratio of sodium tripolyphosphate to calcium hypochlorite is satisfactory, such as 2 parts of sodium tripolyphosphate per part of commercial calcium hypochlorite by weight. Similarly, when the soap used is compounded of coconut oil fatty acids a medium ratio of sodium tripolyphosphate to calcium hypochlorite is suitable. If a laundry were to employ pure sodium stearate as the soap, sodium tripolyphosphate would not prevent precipitation of calcium stearate even though very large ratios were used, such as 160 parts sodium tripolyphosphate per part calcium. If pure sodium palmitate were employed, the ratio would be too high to be economically attractive, though much less than required for sodium stearate. However, with conventional soaps a reasonable ratio, such as 28 to 33 parts by weight of sequestering phosphate per part by weight of calcium present in the calcium hypochlorite is sufficient. I have determined the suitable mixture by examining the soaps offered for laundry purposes. The high titre soaps, in general, require a higher ratio than medium and low titre soaps. Such soaps carry sodium oleate, palmitate, stearate, and minor portions of myristate and laurate. Laundrymen have been accustomed to add the bleach to the laundry wheel during the last suds treatment. If addition of the bleach causes any drop in the suds level, they may be prejudiced against the bleach. With my mix, formed of 25 to 33 parts of phosphate per part of calcium in the form of calcium hypochlorite, the suds will not drop.

Sodium oleate and sodium laurate, by themselves, are not strong suds formers. Addition of sodium tripolyphosphate to a wash solution however, promotes oleate so that it becomes a suds former, and laurate similarly sudses in the presence of added tripolyphosphate. Any loss in sudsing which may result from molecular association of calcium ions with stearate and palmitate ions is offset by the promoted sudsing of the oleate portion of the soap. Similarly the micelle formation based on oleate prevents agglomeration of calcium stearate into curds.

The ratio of tripolyphosphate to commercial calcium hypochlorite most suitably employed is further affected by the temperature of the wash water. Some commercial laundries use quite hot water, running 155–165° F., during the last suds. The rate of formation of calcium soaps, such as stearates and palmitates, increases with increasing temperature. My composition of 25 to 33 parts of phosphate to one part by weight of calcium as commercial calcium hypochlorite is suitable for use at temperatures up to 165° F. with commercial laundry soaps. For household use, lower temperatures are employed in the laundry, usually in the range of 110–130° F., and my composition is also useful for this purpose.

The bead form sodium tripolyphosphate used in the product of my invention should be free of acid ingredients, such as sodium hexametaphosphate, trimetaphosphate, sodium acid pyrophosphate, monosodium phosphate, etc. Ordinarily the overall composition would correspond to $Na_5P_3O_{10}$ which is an alkaline salt, a 1 percent solution in distilled water having a pH value of about 9.2. Individual grains may differ from the average. The product can be made in several ways. If it is made by spraying a solution of monosodium and disodium phosphate, adjusted to have a ratio of 1.67 $Na_2O$ to $P_2O_5$, the final product will correspond to sodium tripolyphosphate. If the above solution is sprayed at too low a temperature, monosodiumdihydrogen phosphate monohydrate may separate in crystalline form. On subsequent furnacing the crystals of this salt may be partly converted to metaphosphate and thus provide acidic grains or particles within an alkaline compound. These acid grains may be tested for in several ways. Mixes made with such material may develop a chlorine odor, either shortly after mixing or on long storage, or after exposure to air. The time required for the chlorine odor to develop would vary with the initial water content of the calcium hypochlorite preparation and with the water content of the tripolyphosphate. By employing essentially anhydrous material, development of chlorine odor may be quite slow, in spite of the presence of detectable amounts of acid grains in the tripolyphosphate. Such dry material may pick up water in use and develop some chlorine odor. I prefer to use material so manufactured that substantially no acidic grains are present.

It should be understood that the chlorine odor does not represent a serious loss of available chlorine. If a calcium hypochlorite product reacts with acid so that 0.01 percent of the available chlorine is released as free chlorine, the odor over the mixture will be objectionable. This small loss would not be detected by ordinary analytical means, and can only be measured by examination of gas drawn through the mixture, using sensitive reagents.

The loose bulk density (weight of a volume of the composition divided by the weight of the same volume of water) of my mixture is under 0.70, and preferably about 0.65. This light density is due to the thin walled, hollow bead structure of the spray formed sodium tripolyphosphate. This gives rapid solution of the tripolyphosphate, as well as good dispersion. Each grain tends to move into water by itself and to dissolve quickly. In contrast, the very small grains of powdered sodium tripolyphosphate cling together, resisting dispersion in water, so that they lump. However, mixtures of ordinary, fine ground sodium tripolyphosphate with sufficient light weight spray dried beads, such as those of sodium sulfate, may be prepared to be in the desired apparent density range, without giving satisfactory performance. The low density must derive from the tripolyphosphate itself, present in thin walled hollow beads.

During the lifetime of the aforementioned patent U.S. 2,097,517, no spray formed sodium tripolyphosphate free from acid grains was available. The development of this material has extended over several years and is now of satisfactory quality. Normally some tetrasodium pyrophosphate is provided for in the material, for example, about 2 to 10 percent, as an added insurance against the presence of acidic grains.

*Example*

Eighteen pounds of granular calcium hypochlorite containing 73 percent of available chlorine and screened to pass a 30-mesh screen but retained on a 70-mesh screen and 132 pounds of spray-dried beads of sodium tripolyphosphate containing about 5 percent of tetrasodium pyrophosphate, beads passing a 30-mesh screen but 90 percent retained on a 70-mesh screen, were mixed in a cone blender for about five minutes to produce the product of the present invention. The apparent density of the mixture was about 0.65 and the available chlorine content was 8.7 percent. The weight ratio of sequestering phosphate to calcium in the calcium hypochlorite was 31:1.

In a commercial laundry wheel sufficient of the mixture was added as solid directly to the wheel during the last suds at a temperature of about 160° F. to provide 80 parts per million of available chlorine. No decrease in the volume of suds was observable and no increase in the quantity of suspended matter in the wash water could be seen. The wash was completed and the clothes were clean, well bleached and free from any sticky deposits or evidence of bleach damage.

The same composition was used in other loads in the laundry wheel, adding sufficient of the calcium hypochlorite-sodium tripolyphosphate mix to provide, in one case, 160 parts per million of available chlorine and, in another case, 240 parts per million. Substantially the same results were observed as when 80 parts per million were used insofar as freedom from sticky deposits and bleach damage were concerned. The whiteness was higher when more available chlorine was introduced.

I claim:
1. A bleaching composition which consists essentially of a mixture of granular calcium hypochlorite and sodium tripolyphosphate in the form of hollow beads; the granules of calcium hypochlorite being of such size that the bulk of them will pass through a 30-mesh sieve but be retained on a 100-mesh sieve, not over 12 percent by weight of the granules passing a 100-mesh sieve and under 5 percent by weight of the granules being retained on a 30-mesh sieve; the sodium tripolyphosphate beads containing up to 10 percent by weight of tetrasodiumpyrophosphate, based upon the weight of the sodium tripolyphosphate and tetrasodiumpyrophosphate; the sodium tripolyphosphate and tetrasodiumpyrophosphate mixture being in the form of hollow beads of such size that the bulk of the beads will pass through a 30-mesh sieve but be retained on a 100-mesh sieve, not over 12 percent by weight of the beads passing through a 100-mesh sieve and under 5 percent by weight of the beads being retained on a 30-mesh sieve; the weight ratio of the sodium tripolyphosphate plus tetrasodiumpyrophosphate to calcium present in the calcium hypochlorite being within the range 25:1 to 100:1.

2. The composition of claim 1 wherein the weight ratio of the sodium tripolyphosphate plus tetrasodiumpyrophosphate to calcium present in the calcium hypochlorite is within the range 28:1 to 33:1.

References Cited in the file of this patent

UNITED STATES PATENTS

| | | |
|---|---|---|
| 1,779,517 | Stevenson et al. | Oct. 28, 1930 |
| 2,097,517 | Durgin | Nov. 2, 1937 |
| 2,446,869 | Cunningham | Aug. 10, 1948 |
| 2,480,579 | Holuba | Aug. 30, 1949 |
| 2,515,577 | Waldeck | July 18, 1950 |
| 2,622,068 | Hizer | Dec. 16, 1952 |
| 2,634,238 | Soule | Apr. 7, 1953 |
| 2,693,454 | Soule | Nov. 2, 1954 |
| 2,773,833 | Lewis et al. | Dec. 11, 1956 |
| 2,820,767 | Robson | Jan. 21, 1958 |